United States Patent
Krebs

(10) Patent No.: US 9,133,551 B2
(45) Date of Patent: Sep. 15, 2015

(54) HYDROGEN EVOLUTION DEVICE AND FUEL CELL SYSTEM COMPRISING THE SAME

(71) Applicant: VARTA Microbattery GmbH, Ellwangen (DE)

(72) Inventor: Martin Krebs, Rosenberg (DE)

(73) Assignee: Varta Microbattery GmbH (DE)

( * ) Notice: Subject to any disclaimer, the term of this patent is extended or adjusted under 35 U.S.C. 154(b) by 170 days.

(21) Appl. No.: 13/788,362

(22) Filed: Mar. 7, 2013

(65) Prior Publication Data

US 2013/0236814 A1 Sep. 12, 2013

(30) Foreign Application Priority Data

Mar. 9, 2012 (EP) .................................... 12158702

(51) Int. Cl.
*H01M 8/06* (2006.01)
*C25B 1/02* (2006.01)
*H01M 16/00* (2006.01)
*C25B 15/02* (2006.01)
*C25B 1/04* (2006.01)
*C25B 9/08* (2006.01)

(52) U.S. Cl.
CPC ... *C25B 1/02* (2013.01); *C25B 1/04* (2013.01); *C25B 9/08* (2013.01); *C25B 15/02* (2013.01); *H01M 8/0656* (2013.01); *H01M 16/003* (2013.01); *Y02E 60/366* (2013.01); *Y02E 60/50* (2013.01)

(58) Field of Classification Search
CPC .................... H01M 2250/20; H01M 2250/402; H01M 8/0612; H01M 8/0656; H01M 8/2475; H01M 8/04037; H01M 8/04268; H01M 8/04365; H01M 8/04753; H01M 8/04388; H01M 8/04798; H01M 8/04604
See application file for complete search history.

(56) References Cited

U.S. PATENT DOCUMENTS

| 5,242,565 | A | 9/1993 | Winsel |
| 2001/0045364 | A1 | 11/2001 | Hockaday et al. |
| 2003/0091503 | A1* | 5/2003 | Rosenfeld et al. ............. 423/657 |
| 2004/0131904 | A1* | 7/2004 | Arthur et al. .................. 429/26 |
| 2004/0229090 | A1 | 11/2004 | Davis et al. |

FOREIGN PATENT DOCUMENTS

| DE | 35 32 335 A1 | 3/1987 |
| DE | 101 55 349 A1 | 5/2003 |
| DE | 10 2005 018 291 A1 | 10/2006 |
| EP | 1 437 918 A1 | 7/2004 |
| EP | 1 970 472 A1 | 9/2008 |
| WO | 2006/111335 A1 | 10/2006 |

OTHER PUBLICATIONS

Robert Hahn, "Development of Portable Systems," Chapter 12, Hydrogen Technology Mobile and Portable Applications, 2008, pp. 409-438.

\* cited by examiner

*Primary Examiner* — Muhammad Siddiquee
(74) *Attorney, Agent, or Firm* — DLA Piper LLP (US)

(57) ABSTRACT

A hydrogen evolution device that liberates hydrogen upon passage of an electric current, wherein an amount of liberated hydrogen is proportional to an amount of the current, includes at least one hydrogen evolution cell including an electrochemically oxidizable anode, a hydrogen cathode and an electrolyte, and at least one heating resistor thermally coupled to the hydrogen cathode directly or via a solid or liquid heat conductor.

13 Claims, 3 Drawing Sheets

HYDROGEN EVOLUTION DEVICE AND FUEL CELL SYSTEM COMPRISING THE SAME

RELATED APPLICATION

This application claims priority of European Patent Application No. 12158702.6, filed Mar. 9, 2012, the subject matter of which is incorporated herein by reference.

TECHNICAL FIELD

This disclosure relates to a hydrogen evolution device which upon an electrical current flowing through releases an amount of hydrogen proportional to the amount of the through-flowing current, as well as to a method of operating such a hydrogen evolution device. The disclosure also relates to a device for supplying a load with electric energy, which includes such a hydrogen evolution device and which further comprises a fuel cell in which hydrogen from the hydrogen evolution device is capable of reacting with an oxidant thereby generating current.

BACKGROUND

WO 2006/111335 A1 discloses a system for supplying a load with electric energy comprising a hydrogen evolution device that releases hydrogen when an electric current flows through. The device is coupled to a fuel cell unit in which hydrogen generated by the hydrogen evolution device can be reacted with an oxidant. The fuel cell unit and the hydrogen evolution device electrically connect in series so that under load the essentially equal current amount flows through the fuel cell unit and the hydrogen evolution device. The hydrogen evolution device preferably comprises button cell-shaped hydrogen evolution cells, as described in DE 35 32 335 A1, for example.

A frequent problem with such systems is that fuel cells have a very high electric resistance which is why starting such a system can be very slow. According to WO 2006/111335 A1, this is counteracted in that a parallel circuit to the fuel cell unit is provided, via which, when connecting a load, an electric current can flow from the hydrogen evolution device bypassing the fuel cell unit. Thus, when switching on the load, current can flow through the hydrogen evolution device unhindered by the high electric resistance of the fuel cell unit. As a result, hydrogen evolution starts within the latter which in turn causes a more rapid activation of the fuel cell units. Thus, a significantly faster system start is achieved than would be the case without the parallel circuit.

In any event, the progress of the start of such a system still may be comparatively slow, for example, as compared to a battery. In particular in the case of low starting temperatures (below 0° C.) it can under certain circumstances take multiple seconds until the system provides its nominal voltage despite the parallel circuit.

SUMMARY

I provide a hydrogen evolution device that liberates hydrogen upon passage of an electric current, wherein an amount of liberated hydrogen is proportional to an amount of the current, including at least one hydrogen evolution cell including an electrochemically oxidizable anode, a hydrogen cathode and an electrolyte, and at least one heating resistor thermally coupled to the hydrogen cathode directly or via a solid or liquid heat conductor.

I also provide a device for supplying a load with electric energy, including the hydrogen evolution device and a fuel cell in which hydrogen from the hydrogen evolution device reacts with an oxidant thereby generating current.

I further provide a hydrogen evolution device which liberates hydrogen upon passage of an electric current, wherein an amount of liberated hydrogen is proportional to an amount of the current, including at least one hydrogen evolution cell including an electrochemically oxidizable anode, a hydrogen cathode and an electrolyte, and at least one heating resistor thermally coupled to the at least one hydrogen evolution cell directly or via a solid or liquid heat conductor.

I further yet provide a method of operating 1) a hydrogen evolution device that liberates hydrogen upon passage of an electric current, wherein an amount of liberated hydrogen is proportional to an amount of the current, wherein the hydrogen evolution device includes at least one hydrogen evolution cell having an electrochemically oxidizable anode, a hydrogen cathode and an electrolyte, or 2) a fuel cell supplied with hydrogen from the hydrogen evolution device, including heating the cathode of the hydrogen evolution device with a heating resistor.

DETAILED DESCRIPTION

Figure 1:
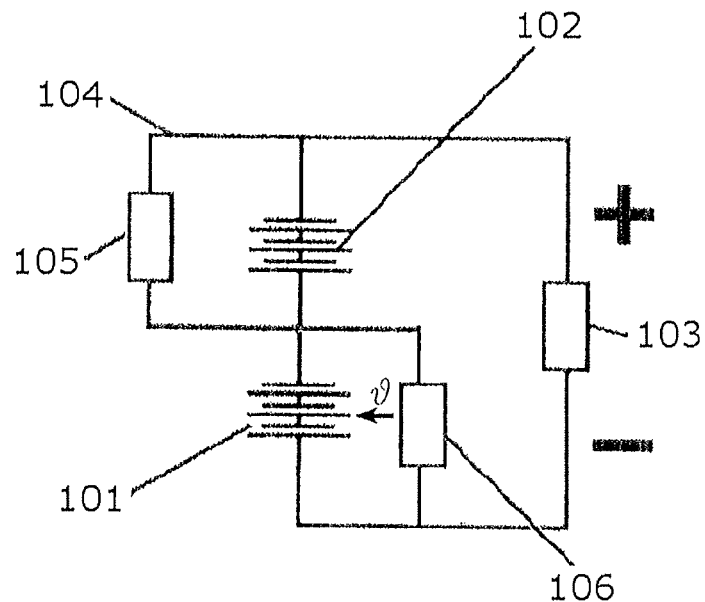
FIG. 1 schematically shows the circuit diagram of an example of one of my devices.

My hydrogen evolution devices comprise at least a hydrogen evolution cell having an electrochemically oxidizable anode, a hydrogen cathode and an electrolyte. During electric current flow, the at least one hydrogen evolution cell and thus also the hydrogen evolution device releases an amount of hydrogen proportional to the amount of the current flowing through.

An aqueous electrolyte may be used as an electrolyte, in particular an alkaline electrolyte, for example, caustic soda or caustic potash.

The anode may be a metal anode, in particular a zinc anode. During operation, the metal or the zinc is oxidized. In counteraction, a reduction occurs at the hydrogen cathode in which hydrogen evolves. With respect to the chemical processes, reference is made to the aforementioned DE 35 32 335 A1 and WO 2006/111335 A1.

In particular, plastic bonded gas diffusion electrodes can be used as hydrogen cathodes. In such electrodes, a plastic binder (mostly polytetrafluoroethylene, PTFE) forms a porous matrix into which particles of an electro-catalytically active material (e.g., of a precious metal such as platinum or palladium) are intercalated. The particles are capable of catalyzing the aforementioned reduction. Generally, production of such electrodes is effected by rolling a dry mixture of the binder and the catalyst into a foil. In turn, the latter can be rolled into a metal mesh, for example, made of silver, nickel or silver-coated nickel. The metal mesh forms a conductor structure within the electrode and serves as a current conductor.

My hydrogen evolution devices may comprise at least one heating resistor coupled thermally to the at least one hydrogen evolution cell directly or via a solid or liquid heat conductor. As generally known, a heating resistor is an electric component which converts electric energy into thermal energy. The thermal energy is transferred directly or via the aforementioned heat conductors to the at least one hydrogen evolution cell. Heating the at least one hydrogen evolution cell allows the catalytic reaction at the hydrogen cathode to proceed more rapidly. In particular with the aforementioned low temperatures, the reaction is strongly kinetically inhibited. Through the heating by the heating resistor, the cathode reaction can proceed more rapidly.

Liquid and solid heat conductors are well-known. For example, a paste containing copper particles can be used as a heat conductor. However, the heating resistor may be in direct contact with the at least one hydrogen evolution cell so that no separate heat conductor is required.

The heating resistor may be thermally coupled to the hydrogen cathode of the at least one hydrogen evolution cell. This is insofar appropriate since, as described, in particular the cathode reaction should be accelerated by the heating.

The hydrogen evolution device may comprise a connector or connection means, by means of which the anode and the cathode of the at least one hydrogen evolution cell can be electrically connected or short-circuited via the heating resistor. The connector/connection means may comprise a manual or an electronic switch. The latter can be coupled to a temperature sensor and configured such that it automatically closes below a predefined temperature and thereby places the heating resistor into operation. The switch may open again as soon as an upper threshold temperature is exceeded (e.g., measurable by a further temperature sensor).

I may use hydrogen evolution cells which in the rest state have an open circuit voltage. This means that upon electrically connecting the poles (anode and cathode) of the hydrogen evolution cells, a current flows between the poles of the gas evolution cell and the hydrogen evolution starts without an external driving force. Suitable are, for example, the electrochemical systems described in DE 35 32 355 A1 which have an open circuit voltage between 0.25 V and 0.35 V.

When electrically connecting the anode and cathode of such a hydrogen evolution cell with the connector/connection means via the heating resistor, the hydrogen evolution cell per se supplies the energy which finally causes its heating by the heating resistor. In other words, the heating resistor obtains the energy required for heating from the electromotive force of the hydrogen evolution cell. An external energy source is not required.

One advantage therein is that with the current flowing across the connector/connections means, hydrogen is generated and the cell is heated at the same time.

My hydrogen evolution device may comprise two or more hydrogen evolution cells which may be arranged side by side or form a stack. Within the hydrogen evolution device, the hydrogen evolution cells can be connected in series or in parallel. In each case a heating resistor may be arranged between adjacent hydrogen evolution cells. In case the hydrogen evolution device comprises two or more heating resistors, in particular arranged between adjacent gas evolution cells, the latter may be electrically connected in series.

Basically, my hydrogen evolution devices may comprise button cell-shaped hydrogen evolution cells as described in WO 2006/111335 A1. However, the shape of the hydrogen evolution cells can be selected arbitrarily. My hydrogen evolution cells may be used in a prismatic or a disk configuration. When in a prismatic shape, the hydrogen evolution cells may be configured as rectangular or square sheet or as a flat square. The aforementioned stacks can be formed especially well in particular from such hydrogen evolution cells.

The at least one heating resistor may be configured as a thin sheet, film or mat. Such flat heating devices are known. For example, they may include heating devices in which web-shaped heating elements, for example, manufactured by etching of metal foils, are laminated between plastic insulating foils. Such heating devices can be used due to their thin profile in various ways. In particular in the type of foils or mats, they allow establishing a very good thermal connection to the object to be heated due to their flexibility.

My heating resistors may comprise a high-resistance conductor and/or a transistor, in particular a field-effect transistor (FET). As a material for the high-resistance conductor, for example, special heat conductor alloys or resistance alloys can be used which have an almost constant specific electric resistance over wide temperature ranges and which may have a high melting point and/or are resistant to oxidation in the air. Such alloys are known.

The heating resistor may comprise a high-resistance conductor to be switched via an electronic switch, in particular a FET.

My devices may supply a load with electric power. The load can be any electrically operated device.

My devices may comprise a hydrogen evolution device as described above. Furthermore, my devices may comprise a fuel cell in which hydrogen from the hydrogen evolution device is capable of reacting with an oxidant thereby generating power.

Basically, the fuel cell can be any fuel cell capable of effecting a reaction of hydrogen with an oxidant. For example, the foil fuel cells described in DE 101 55 349 A1 can be used. For example, low-temperature fuel cells, in particular fuel cells operated at temperatures between 50° C. and 120° C., may be used. The oxidant may be atmospheric oxygen.

The hydrogen evolution devices and the fuel cells may be electrically connected in series so that under load the essentially same current amount flows through the gas evolution device and through the fuel cell. An advantage of such an arrangement is described in WO 2006/111335 A1. In such an arrangement, my devices adapt their electric capacity dynamically to the capacity demand of the respective load, basically allowing omission of a separate (elaborate) control system.

Besides the heating resistor integrated in the hydrogen evolution device, my devices may comprise a further heating resistor thermally coupled to the fuel cell directly or via a solid heat conductor. As described above, even fuel cells when started from an idle condition exhibit a relatively slow performance and, therefore, a parallel circuit to the fuel cell unit was provided in the system described in WO 2006/111335 A1. On integrating a heating resistor in such a parallel circuit and thermally coupling the same to the fuel cell, also at this point starting the device can be supported.

Furthermore, I provide several methods. One method operates a hydrogen evolution device which may comprise at least a hydrogen evolution cell having an electrochemically-oxidizable anode, a hydrogen cathode and an electrolyte and which upon flow of an electric current releases an amount of hydrogen proportional to the amount of through-flowing current. Another method operates a fuel cell system comprising one of the described hydrogen evolution devices and at least one fuel cell. The methods may include that the hydrogen evolution devices, in particular the cathode of the hydrogen evolution devices, are heated by a heating resistor.

The heating resistor may obtain the energy required for heating the hydrogen evolution device from the hydrogen evolution device itself. To that end, the anode and the cathode of the hydrogen evolution device can electrically be connected by the above described connector/connecting means via the heating resistor.

The heating resistor may be switched-on below a lower threshold temperature and switched-off again above an upper threshold temperature.

Further features result from the following description of selected, representative examples. The features described and shown can in each case be realized on their own or as a combination thereof in various examples of my devices, systems and methods. The examples merely serve for explanatory purposes and a better understanding and shall not be regarded as limiting.

In FIG. 1, a simple electric circuit of an example of devices is shown which supplies a load with electric energy.

The fuel cells 102 and the hydrogen evolution device 101 (comprising three hydrogen evolution cells) electrically connect in series. The hydrogen evolution cells in each case have an open circuit voltage between 0.25 V and 0.35 V. In case the electric load 103 connects thereto, at first a relatively low current flows via the parallel circuit 104 which comprises the electronic component 105. The component 105 can, for example, be a diode or an electronic switch. This can also be a heating resistor thermally coupled to the fuel cells 102. Upon current flowing through the parallel circuit 104, hydrogen evolution starts in the hydrogen evolution device 101. The hydrogen produced reacts with an oxidant, in particular with oxygen, in the fuel cells 102.

Starting the hydrogen evolution device can be supported by switching on the heating resistor 106 during the start. The heating resistor 106 is thermally coupled to the hydrogen evolution device 9 and transfers heat to the latter directly after initiation.

Figure 2:
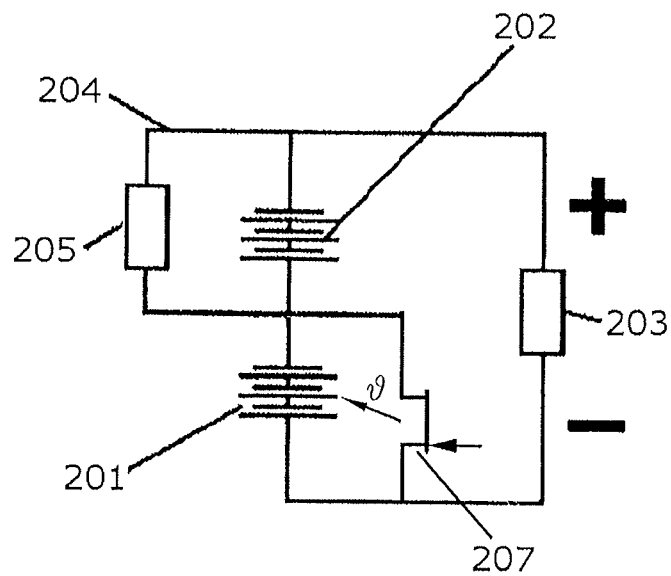
FIG. 2 schematically shows the circuit diagram of a further example of one of my devices.

In FIG. 2, another simple electric circuit of an example of my devices is shown which supplies a load with electric energy.

The fuel cells 202 and the hydrogen evolution device 201 (comprising three hydrogen evolution cells) electrically connect in series. The hydrogen evolution cells in each case have an open circuit voltage between 0.25 V and 0.35 V. If the electric load 203 connects thereto, at first a relatively low current flows through the parallel circuit 204 which comprises the electric component 205. For example, the component 205 can be a diode or an electronic switch. This can also be a heating resistor thermally coupled to the fuel cells 202. Upon current flowing through the parallel circuit 204, a hydrogen evolution starts in the hydrogen evolution device 201. The hydrogen produced reacts with an oxidant, in particular with oxygen, in the fuel cells 202.

Starting the hydrogen evolution device can be supported by switching on the field-effect transistor 206 as a heating resistor during the start. The field effect transistor 206 is thermally coupled to the hydrogen evolution device 201 and transfers heat to the same directly after initiation.

Figure 3:
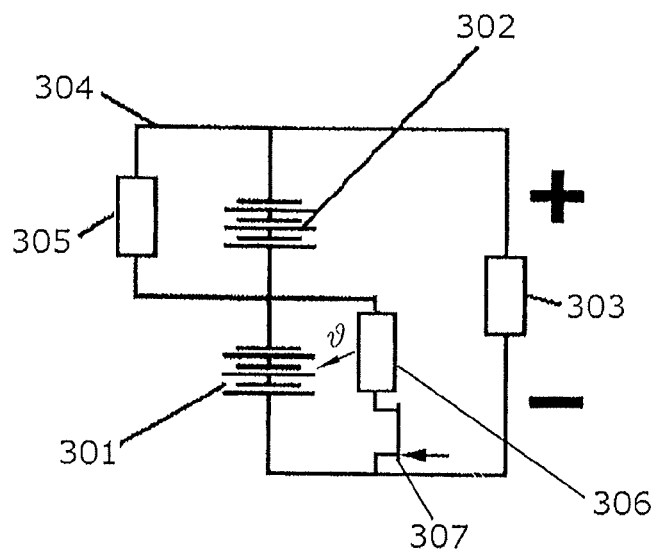
FIG. 3 schematically shows the circuit diagram of yet another example of one of my devices.

In FIG. 3, a further simple electric circuit of an example of one of my devices is shown which supplies a load with electric energy.

The fuel cells 302 and the hydrogen evolution device 301 (comprising three hydrogen evolution cells) electrically connect in series. The hydrogen evolution cells in each case have an open circuit voltage between 0.25 V and 0.35 V. If the electric load 303 connects thereto, at first a relatively low current flows through the parallel circuit 304 which comprises the electric component 305. For example, the component 305 can be a diode or an electronic switch. This can also be a heating resistor thermally coupled to the fuel cells 302. Upon current flowing through the parallel circuit 304, a hydrogen evolution starts in the hydrogen evolution device 301. The hydrogen produced reacts with an oxidant, in particular with oxygen, in the fuel cells 302.

Starting the hydrogen evolution device can be supported by switching on the heating resistor 306 via the field-effect transistor 307 during the start. The heating resistor 306 thermally couples to the hydrogen evolution device 301 and transfers heat to the same directly after initiation.

Figure 4:
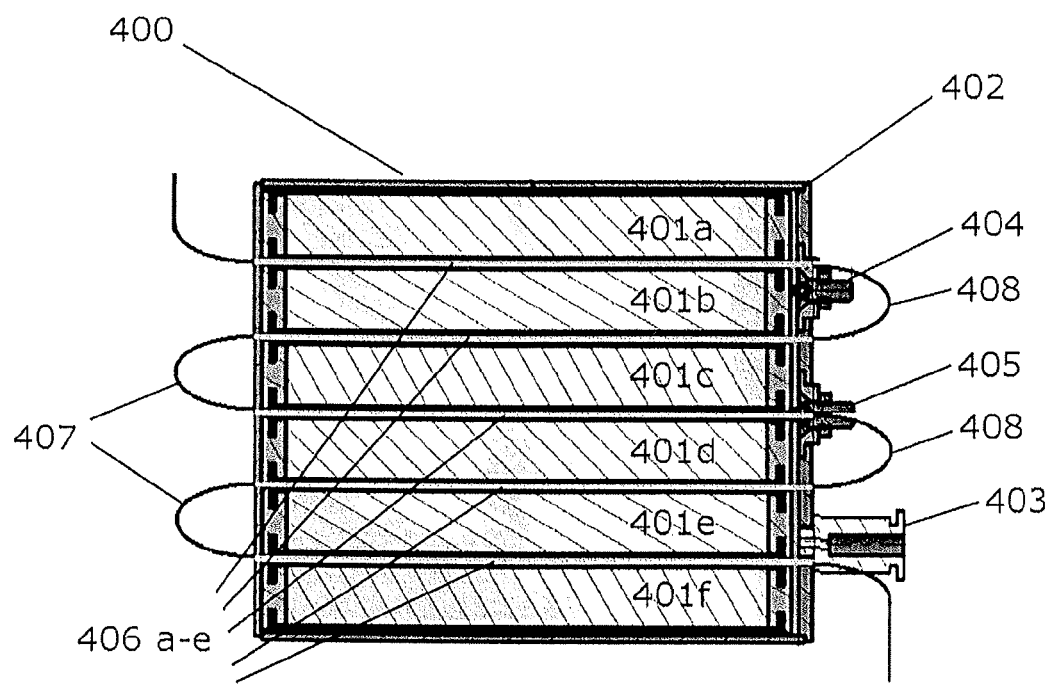
FIG. 4 shows an example of one of my hydrogen evolution devices comprising multiple hydrogen evolution cells.

In FIG. 4, a hydrogen evolution device 400 is shown. The latter comprises the hydrogen evolution cells 401a to 401f. Each of these cells is configured as a rectangular sheet. The sheet-shaped cells 401a to 401f are arranged in a stack. Each of the sheets comprises a housing in which a hydrogen cathode and an oxidizable metal anode are arranged. The housings of the hydrogen evolution devices are porous at least in partial regions so that hydrogen produced in the cells can escape. The hydrogen evolution cells 401a to 401f are surrounded by a housing 402. The latter is penetrated by the poles 404 and 405. One of the poles electrically connects to the oxidizable metal anodes of the cells 401a to 401f, the other one connects to the hydrogen cathodes of the cells 401a to 401f. Hydrogen generated inside the housing 402 can be released by the valve 403.

The interspaces between the sheet-shaped hydrogen evolution cells 401a to 401f are filled with the heating elements 406a to 406e. These heating elements are heating foils connected in series via the electric connecting means 407 and 408. A large-area heating of the hydrogen evolution cells 401a to 401f is possible by the foils.

Figure 5:
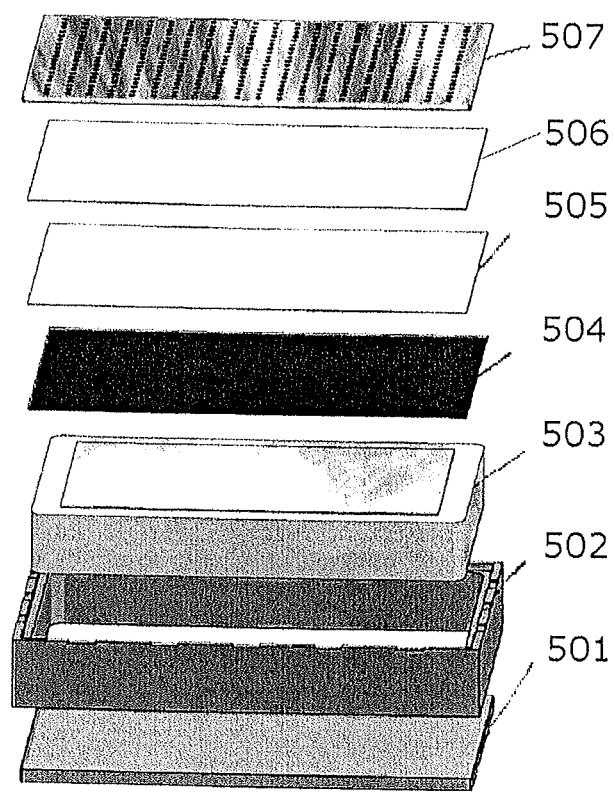
FIG. 5 illustrates the structure of a hydrogen evolution cell as can be used in the hydrogen evolution device shown in FIG. 4.

In FIG. 5, the structure of one of the hydrogen evolution cells contained in the hydrogen evolution device 400 is illustrated. Such a cell comprises an anode lid 501, in particular made from tri-metal, a housing frame 502 (for example, made from plastics) as well as an anode mass 503 which can, for example, be a zinc-containing paste. The cathode strip 504 is laid onto the anode mass 503, which strip in turn is shielded by at least one micro-porous PTFE foil 505. This is followed by the gas diffusion mat 506 and the lid 507 provided with holes.

Although the devices, systems and methods have been described in connection with specific forms thereof, it will be appreciated that a wide variety of equivalents may be substituted for the specified elements described herein without departing from the spirit and scope of this disclosure as described in the appended claims.

The invention claimed is:

1. A hydrogen evolution device that liberates hydrogen upon passage of an electric current, wherein an amount of liberated hydrogen is proportional to an amount of the current, comprising:
    at least one hydrogen evolution cell comprising an electrochemically oxidizable anode, a hydrogen cathode and an electrolyte; and
    at least one heating resistor thermally coupled to the hydrogen cathode directly or via a solid or liquid heat conductor and configured to accelerate hydrogen evolution when the cathode is heated via the at least one heating resistor.

2. The hydrogen evolution device according to claim 1, further comprising a manual or electronic switch by which the anode and the cathode can electrically connect via the heating resistor.

3. The hydrogen evolution device according to claim 1, comprising a stack of two or more gas evolution cells, wherein a heating resistor is arranged between adjacent gas evolution cells.

4. The hydrogen evolution cell according to claim 3, further comprising two or more heating resistors arranged between adjacent gas evolution cells which are electrically connected in series.

5. The hydrogen evolution device according to claim 1, wherein the at least one hydrogen evolution cell is prismatic, a sheet, a flat cuboid or a disk.

6. The hydrogen evolution device according to claim 1, wherein the at least one heating resistor is a sheet, foil or mat.

7. The hydrogen evolution device according to claim 1, wherein the heating resistor comprises a high-resistance conductor and/or a field-effect transistor.

8. The hydrogen evolution device according to claim 1, wherein the heating resistor comprises a high-resistance conductor switched with a field-effect transistor electronic switch.

9. A device for supplying a load with electric energy, comprising:
 a hydrogen evolution device according to claim 1; and
 a fuel cell in which hydrogen from the hydrogen evolution device reacts with an oxidant thereby generating current.

10. The device according to claim 9, wherein the hydrogen evolution device and the fuel cell electrically connect in series so that, under load, an essentially equal current amount flows through the gas evolution device and through the fuel cell.

11. The device according to claim 9 further comprises a further heating resistor thermally coupled to the fuel cell directly or via a solid heat conductor.

12. The device according to claim 11, wherein the further heating resistor and the fuel cell connect in parallel.

13. A hydrogen evolution device which liberates hydrogen upon passage of an electric current, wherein an amount of liberated hydrogen is proportional to an amount of the current, comprising:
 at least one hydrogen evolution cell comprising an electrochemically oxidizable anode, a hydrogen cathode and an electrolyte; and
 at least one heating resistor thermally coupled to the at least one hydrogen evolution cell directly or via a solid or liquid heat conductor and configured to accelerate hydrogen evolution when the cathode is heated via the at least one heating resistor.

* * * * *